US005193129A

United States Patent [19]

Kramer

[11] Patent Number: 5,193,129

[45] Date of Patent: Mar. 9, 1993

[54] PRESSURE SENSOR UTILIZING MICROBENDING OF A FIBER OPTIC CABLE WOVEN THROUGH A LADDER SHAPED STRUCTURE

[75] Inventor: Dennis A. Kramer, Troy, Mich.

[73] Assignee: Rockwell International Corporation, Pittsburgh, Pa.

[21] Appl. No.: 766,878

[22] Filed: Sep. 27, 1991

[51] Int. Cl.[5] ........ G02B 6/00; G02B 6/36

[52] U.S. Cl. ........ 385/13; 250/227.14

[58] Field of Search ........ 250/227.14; 385/12, 385/13

[56] References Cited

U.S. PATENT DOCUMENTS

| | | | |
|---|---|---|---|
| 4,421,979 | 12/1983 | Asawa et al. | 385/13 X |
| 4,537,469 | 8/1985 | Kircher | 385/13 |
| 4,701,614 | 10/1987 | Jaeger et al. | 385/13 X |
| 4,725,124 | 2/1988 | Taylor | 385/13 X |
| 4,927,232 | 5/1990 | Griffiths | 385/13 |
| 5,056,884 | 10/1991 | Quinlan, Jr. | 385/13 |

*Primary Examiner*—Akm E. Ullah

[57] ABSTRACT

A pressure detector including a fiber optical cable woven through a ladder-like structure which is then encapsulated and surrounded by a cover. Light transmitted through the fiber optic cable is diminished to a value less than a threshold value upon the occurrence of microbending caused by pressure applied at any location along the length thereof. The rungs of the ladder-like structure are sized and spaced to provide a proper locus about which microbending may be produced. In addition, the rungs may be round in cross-section and/or otherwise shaped to enhance the sensitivity of the system.

9 Claims, 2 Drawing Sheets

12

16

10

14

PRESSURE SENSOR UTILIZING MICROBENDING OF A FIBER OPTIC CABLE WOVEN THROUGH A LADDER SHAPED STRUCTURE

BACKGROUND OF THE INVENTION

1. Field of the Invention

This invention relates to pressure sensors incorporating a fiber optic cable which provides an indication of pressure upon the onset of microbending and, more particularly, a pressure sensor incorporating a fiber optic cable which is placed in physical contact by interweaving the cable through rungs of a ladder-like structure.

2. Description of the Prior Art

Techniques for providing pressure detection are known in the art. One such technique includes conducting light through a fiber optic cable and sensing a reduction in light transmission therethrough as a result of deformation (i.e., microbending) of the cable. In addition, several techniques exist for enhancing the sensitivity of a fiber optic cable to microbending. Among these include the technique of wrapping a relatively thinner diameter member in a serpentine fashion about a fiber optic cable. Another technique comprises placing small protrusions on the peripheral surface of the fiber optic cable itself. Both of these techniques require processing the fiber optic cable in a special manner. Thus, an expensive secondary operation must be performed on the fiber optic cable to accomplish preparation of such pressure sensors. As such, the fiber optic cable is relatively expensive and subject to damage during such secondary operations. Another approach known in the art for accomplishing microbending of fiber optic cable is to place a fiber optic cable in affiliation with a separate structural member having a multitude of protrusions disposed thereon. Any pressure between the fiber optic cable and the protrusions will result in microbending of the fiber optic cable. Such a technique requires placing the fiber optic cable in contact with the separate structural member. The effectiveness of the interrelationship between these two members is substantially impaired if the fiber optic cable and the structural member are not properly positioned with respect to one another. As such, an investment is required in structure to achieve and maintain this affiliation. Therefore, there is a need for a pressure sensor that is inexpensive to construct and uses a standard fiber optic cable.

SUMMARY OF THE PRESENT INVENTION

The present invention is a pressure detector including a fiber optic cable woven through a ladder-like structure which is then encapsulated and surrounded by a cover. Light transmitted through the fiber optic cable is diminished to a value less than a threshold value upon the occurrence of microbending caused by pressure applied at any location along the length thereof. The rungs of the ladder-like structure are sized and spaced to provide a proper locus about which microbending may be produced. In addition, the rungs may be round in cross-section and/or otherwise shaped to enhance the sensitivity of the system.

These and other aspects of the present invention will become more readily apparent by reference to the following detailed description of the embodiments as shown in the drawings.

DETAILED DESCRIPTION OF THE PREFERRED EMBODIMENT

Figure 1:
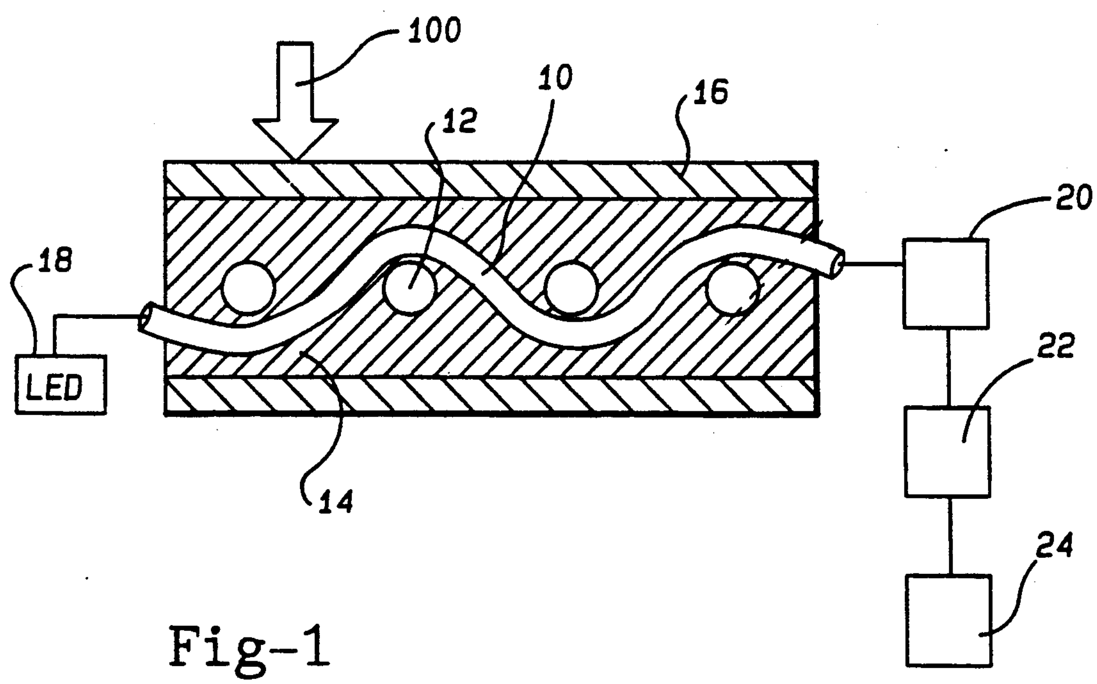
FIG. 1 is a side view of a sensor assembly as contemplated by the present invention.
Figure 2:
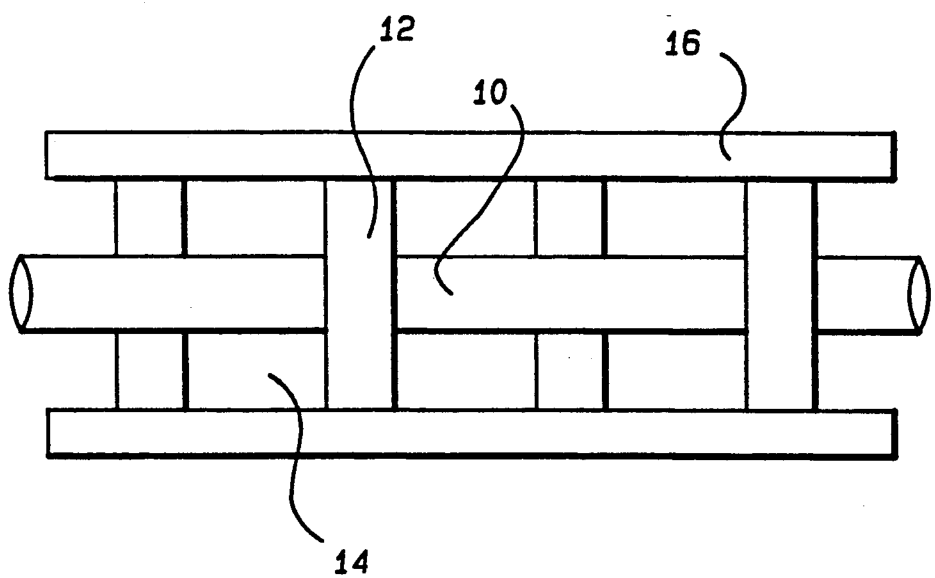
FIG. 2 is a top view of the sensor assembly of FIG. 1.

The present invention incorporates a fiber optic cable 10 which is interwoven through rungs of a ladder-like structure 12 encapsulated in a foam-like material 14 and then surrounded by a sheath 16. In operation, a light source LED 18 transmits a known amount of light through fiber optic cable 10 which is received at phototransistor 20. Phototransistor 20 converts the light amplitude received thereby to a current which is supplied to a threshold comparator 22 which provides an indication that a light threshold has been interrupted in the event of pressure applied to the sensor assembly such as shown by arrow 100. Cable 10 is preferably a 100 micron multi-mode fiber optic cable with a numerical aperture of 0.1 and a step index between the core and the cladding. The cable may be interwoven as shown in FIG. 1 and 2 through sequential rungs 12 of the respective ladder structure. Varying levels of sensitivity may be accomplished by spacing the rungs at various intervals and/or skipping rungs of ladder 12.

Figure 3:
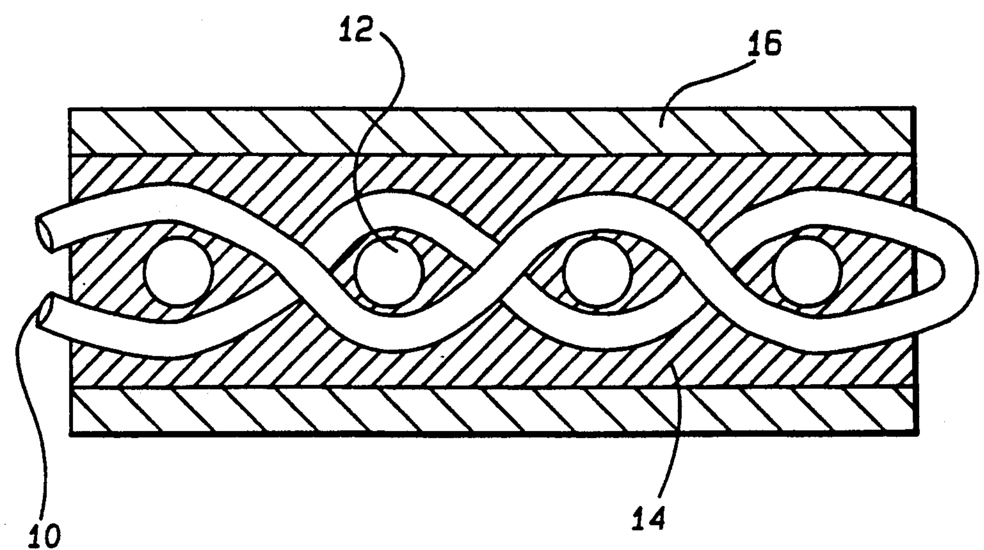
FIG. 3 is a side view of the sensor assembly as contemplated by the present invention featuring a second loop of cable.
Figure 4:
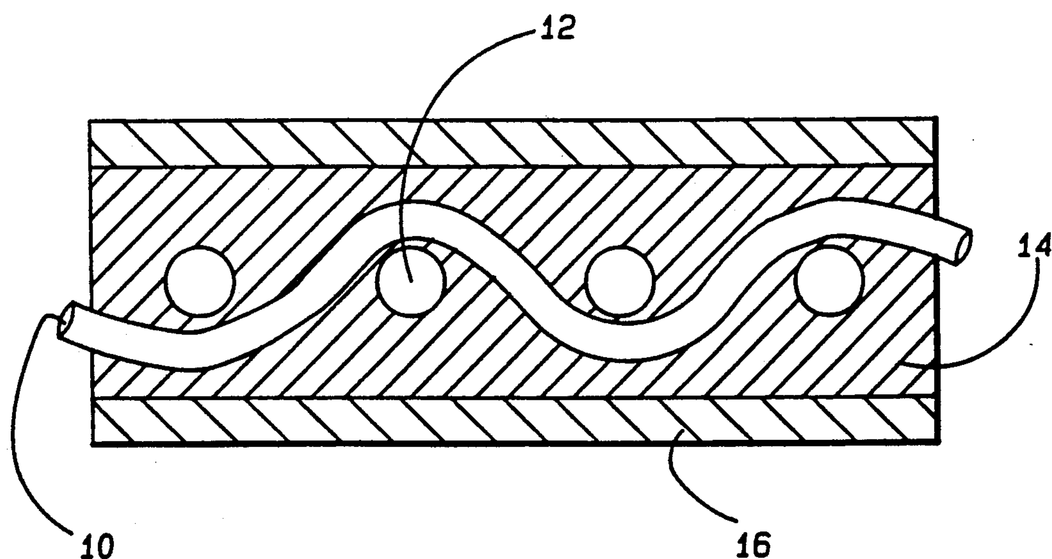
FIG. 4 is a cross-sectional view of a second embodiment of the present invention.

In the preferred embodiment of the present invention the rungs are circular in cross section but may be of any desired cross section to enhance sensitivity and/or extend the fatigue life of the cable. Encapsulation 16 provides a protective barrier around cable 10 and ladder structure 12 preventing mechanical damage thereof. Cover 16 provides a mechanical barrier for the entire assembly. In operation, a signal provided by light source 18 is conducted through cable 10 and detected by phototransistor 20. This signal is characterized by a first transmission loss resulting in a first magnitude light quantity incident upon said light detector. The sensor assembly is calibrated by adjusting a threshold value at threshold comparator 22. A pressure 100 applied to fiber optic cable 10 which produces microbending thereof will reduce the light transmitted therethrough to an amount less than the threshold amount monitored by threshold comparator 22. Pressure 100 deforms cable 10 resulting in a second magnitude light quantity conducted therethrough as a result of a second transmission loss characteristic. In such an instance, a signal will be supplied to indicator 24 providing indication of the detection of pressure 100 applied to the pressure sensor assembly. Ladder 12 is free to move about within cover 16 in response to any pressure transmitted by encapsulation 14. Thus, pressure exerted on one side may result in microbending of the cable on the opposite side enhancing sensitivity of the entire assembly. In another embodiment of the present invention, as shown in FIG. 3, the fiber optic cable of the present invention is woven in reverse direction to that of the structure previously described (i.e., out of phase thereto) so as to enhance the lengthwise sensitivity of the sensor assembly. Such may be necessary to assure sensor sensitivity of small diameter objects sought to be sensed thereby. In addition, as shown in FIG. 4, the rungs of ladder 12 may be sequentially spaced along displaced parallel axes. Such a technique will provide a sensor assembly having a heightened sensitivity as the radius which the fiber optic cable 10 must achieve about rungs of ladder 12 results in a structure which is more sensitive to microbending.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A pressure sensor comprising:

a plurality of parallel axially spaced members having a first portion disposed above an axis defined therethrough and a second portion disposed below said axis;

means for retaining said members in parallel axially spaced relation;

a light conduit disposed in contact with said parallel axially spaced members so as to alternatively engage first and second portions of sequential parallel axially spaced members;

a light source connected to an end of said conduit for directing a known quantity of light into said conduit;

a light detector connected to an opposing end of said conduit for detecting the quantity of light transmitted therethrough;

said conduit defining an undeformed transmission property characterized by a first transmission loss providing a first magnitude light quantity incident upon said light detector and a deformed transmission property characterized by a second transmission loss providing a second magnitude light quantity;

means for comparing the quantity of light transmitted therethrough to a threshold value; and means for indication upon said second quantity becoming less than said threshold value.

2. The invention of claim 1 wherein said light source is an LED.

3. The invention of claim 1 wherein said light source is a pulsed signal.

4. The invention of claim 1 wherein said light detector is a phototransistor.

5. The invention of claim 1 wherein said axially spaced members have a circular cross-section.

6. The invention of claim 1 wherein said means for retaining said members in parallel axially spaced relation comprises parallel extending members connecting to opposite ends of said parallel axially spaced members.

7. The invention of claim 6 wherein said light conduit and said parallel extending members connecting to opposite ends of said parallel axially spaced members are encapsulated and disposed within a cylindrical shaped members.

8. The invention of claim 1 wherein said members are coplanar.

9. The invention of claim 1 wherein said members are sequentially spaced a predetermined distance from one another along parallel axes.

* * * * *